US008737634B2

(12) United States Patent
Brown et al.

(10) Patent No.: US 8,737,634 B2

(45) Date of Patent: May 27, 2014

(54) WIDE AREA NOISE CANCELLATION SYSTEM AND METHOD

(75) Inventors: Christopher A. Brown, Bloomington, IN (US); John F. Schneider, Huntingburg, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 570 days.

(21) Appl. No.: 13/052,023

(22) Filed: Mar. 18, 2011

(65) Prior Publication Data

US 2012/0237049 A1 Sep. 20, 2012

(51) Int. Cl.

| | |
|---|---|
| ***G10K 11/178*** | (2006.01) |
| ***H04R 3/02*** | (2006.01) |
| ***H04R 29/00*** | (2006.01) |
| ***H04R 3/00*** | (2006.01) |
| *H04B 3/00* | (2006.01) |
| *H04R 27/00* | (2006.01) |

(52) U.S. Cl.

USPC ..... 381/71.11; 381/71.1; 381/71.7; 381/73.1; 381/56; 381/92

(58) Field of Classification Search

USPC ............ 381/71.1–71.14, 93, 94.1–94.9, 73.1, 381/56, 92, 77, 82

See application file for complete search history.

(56) References Cited

U.S. PATENT DOCUMENTS

| | | | | | |
|---|---|---|---|---|---|
| 4,208,735 | A | * | 6/1980 | Suzuki et al. | 367/136 |
| 4,473,906 | A | | 9/1984 | Warnaka et al. | |
| 4,562,589 | A | | 12/1985 | Warnaka et al. | |
| 5,018,202 | A | | 5/1991 | Takahashi et al. | |
| 5,189,425 | A | * | 2/1993 | Dabbs | 342/52 |
| 5,448,645 | A | | 9/1995 | Guerci | |
| 5,699,437 | A | * | 12/1997 | Finn | 381/71.7 |
| 5,834,647 | A | * | 11/1998 | Gaudriot et al. | 73/570 |
| 5,966,452 | A | | 10/1999 | Norris | |
| 6,041,127 | A | * | 3/2000 | Elko | 381/92 |
| 6,463,156 | B1 | * | 10/2002 | Gaudriot et al. | 381/71.1 |
| 6,738,482 | B1 | | 5/2004 | Jaber | |
| 7,317,801 | B1 | * | 1/2008 | Amir | 381/71.1 |
| 7,492,911 | B2 | | 2/2009 | Nakajima et al. | |
| 2002/0048376 | A1 | | 4/2002 | Ukita | |
| 2005/0254664 | A1 | | 11/2005 | Kwong et al. | |
| 2005/0276422 | A1 | | 12/2005 | Buswell et al. | |
| 2006/0285697 | A1 | | 12/2006 | Nishikawa et al. | |
| 2007/0036367 | A1 | | 2/2007 | Ko | |

(Continued)

FOREIGN PATENT DOCUMENTS

| | | |
|---|---|---|
| JP | 7219559 | 9/1995 |
| JP | 2001/172925 | 6/2001 |
| JP | 2003/108151 | 4/2003 |

OTHER PUBLICATIONS

Efron, et al., Wide-Area Adaptive Active Noise Cancellation, IEEE Transactions on Circuits and Systems, vol. 41, No. 6, pp. 405-409, Jun. 1994.

(Continued)

*Primary Examiner* — Davetta W Goins
*Assistant Examiner* — Daniel Sellers
(74) *Attorney, Agent, or Firm* — Christopher A. Monsey

(57) ABSTRACT

An open air, wide area noise cancellation system and method provides improved identification and characterization of noise sources then generating noise cancelling sound waves.

43 Claims, 9 Drawing Sheets

(56) References Cited

U.S. PATENT DOCUMENTS

| | | | | |
|---|---|---|---|---|
| 2007/0223714 | A1 | 9/2007 | Nishikawa | |
| 2007/0297620 | A1 | 12/2007 | Choy | |
| 2008/0159555 | A1 | 7/2008 | Asada et al. | |
| 2008/0170729 | A1* | 7/2008 | Lissaman et al. | 381/303 |
| 2009/0136052 | A1 | 5/2009 | Hohlfeld et al. | |
| 2010/0034398 | A1 | 2/2010 | Odent et al. | |
| 2011/0274283 | A1* | 11/2011 | Athanas | 381/71.7 |
| 2012/0057716 | A1* | 3/2012 | Chang et al. | 381/71.1 |

OTHER PUBLICATIONS

Federal Signal Corporation, Modulator Series Speaker Arrays, Installation and Maintenance Instructions, 23 pages, Mar. 2007.

Federal Signal Corporation, Directional Speaker Array, Model DSA brochure, 2 pages, 2009.

* cited by examiner

WIDE AREA NOISE CANCELLATION SYSTEM AND METHOD

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon.

BACKGROUND AND SUMMARY OF THE DISCLOSURE

The present disclosure relates generally to an open air, wide area noise cancellation system and method. More particularly, the present disclosure relates to a system and method for improved identification and characterization of noise sources including identifying locations and predicted paths of moving noise sources and then generating noise cancelling sound waves based on the detected locations and predicted paths of the noise sources.

As cities continue to grow, environmental noise pollution has become an increasing problem for the location of homes and businesses. Airports, highways, construction sites, and factories are common noise producing sources located near homes and businesses.

Noise blocking walls are often built between roads and nearby houses. However, it is not practical to build sound blocking walls to block off all homes and businesses from noise producing sources. The wide area noise cancellation system and method of the present disclosure provides improved noise cancellation without requiring the use of such noise blocking walls or other sound blocking structures.

As air traffic continues to increase and cities continue to grow, homes and businesses are often located near airports. At the same time, the size of aircraft continues to increase leading to greater noise pollution. Public complaints often lead to restrictions being imposed on flight paths and operation hours for airports. Often, residential development may be prohibited or restricted in areas surrounding the airport flight paths. The system and method of the present disclosure reduces the impact of noise pollution within areas located near common noise sources, such as airports. Therefore, the present system and method may allow use of property close to airports (or other noise sources) without requiring substantial usage restrictions.

While one embodiment of the present disclosure is particularly useful in areas surrounding airports, other embodiments may be used in other areas such as near construction sites, sporting venues such as automobile race tracks, factories or adjacent highways. In one embodiment, the open air noise cancellation system of the present disclosure is used in areas surrounding a military base or other noise producing area to substantially reduce or cancel noises occurring on the base from being heard outside a base perimeter. This reduces the likelihood that persons located outside the base perimeter will hear operations occurring inside the military base.

In one illustrated embodiment of the present disclosure, a wide area noise cancellation system is provided for reducing the effect of noise generated by at least one noise source within a noise producing area at locations outside the noise producing area. The system includes a plurality of spaced apart microphone arrays positioned within the noise producing area. Each microphone array detects noise from at least one noise source located in the noise producing area and generates an output signal indicative of the detected noise. The system also includes a noise signal processor configured to receive the output signals from the plurality of microphone arrays. The processor processes the output signals to determine noise cancellation signals to reduce the effect of noise from the at least one noise source. The system further includes a plurality of speaker arrays located at spaced apart locations around a periphery of the noise producing area. The plurality of speaker arrays receive the noise cancellation signals from the processor and generate inverse sound waves to reduce the effect of the noise from the at least one noise source before the noise from exits the noise producing area.

In one illustrated embodiment, the plurality of microphone arrays are spaced apart around a perimeter of noise producing area, and the plurality of speaker arrays are spaced apart around the perimeter of noise producing area at locations radially outwardly from the locations of the plurality of microphone arrays. Illustratively, the noise producing area is a military base, a construction site, or a factory.

In another illustrated embodiment of the present disclosure, a method is provided for reducing the effect of noise generated by at least one noise source within a noise producing area at locations outside the noise producing area. The method includes providing a plurality of speaker arrays located at spaced apart locations around a periphery of the noise producing area, detecting noise from the at least one noise source located in the noise producing area, determining noise cancellation signals based on the detected noise to reduce the effect of noise from the at least one noise source, and driving the plurality of speaker arrays with the noise cancellation signals to generate inverse sound waves to reduce the effect of the noise from the at least one noise source before the noise from exits the noise producing area.

In yet another illustrated embodiment of the present disclosure, a wide area noise cancellation system is provided for reducing the effect of noise generated by a noise source. The system includes at least one speaker array and at least one microphone array configured to detect noise from the noise source before the noise reaches the at least one speaker array. Each speaker array includes a plurality of speakers arranged to provide substantially 360° coverage for sound waves produced by the speaker array. Each microphone array generates an output signal indicative of the noise detected from the noise source. The system also includes a noise signal processor configured to receive the output signals from the at least one microphone array. The processor processes the output signals to determine a location of the noise source, to determine inverse sound waves based on the output signals, and to generate noise cancellation signals to drive the at least one speaker array so that the at least one speaker array genera s the inverse sound waves to reduce the effect of the detected noise from the noise source before the noise reaches the location of the at least one speaker array.

In an illustrated embodiment, the noise source is a moving noise source, and the processor determines the location and a predicted path of the moving noise source based on the output signals received from the at least one microphone array. The location and the predicted path of the moving noise source are used by the processor along with the output signals from the at least one microphone array to determine the inverse sound wave. In one illustrated embodiment, the processor adjusts a phase and a frequency of the inverse sound waves based on the location of the at least one speaker array relative to the location and the predicted path of the noise source.

In still another illustrated embodiment of the present disclosure, a method is provided for reducing the effect of noise generated by a noise source. The method includes providing at least one speaker array. Each speaker array includes a plurality of speakers arranged to provide substantially 360° coverage for sound waves produced by the speaker array. The method also includes detecting noise from the noise source before the noise reaches the at least one speaker array, determining a location of the noise source, generating noise cancellation signals based on the detected noise and the determined location of the noise source, and driving the at least one speaker array with the noise cancellation signals so that the at least one speaker array generates the inverse sound waves to reduce the effect of the detected noise from the noise source before the noise reaches the location of the at least one speaker array.

In one illustrated embodiment of the present disclosure, the method further includes generating calibration sound waves with the at least one speaker array, detecting the calibration sound waves, determining areas of sound interference within a noise cancellation area, and adjusting the noise cancellation signals based on the determined areas of sound interference within the noise cancellation area.

In another illustrated embodiment of the present disclosure, the method further includes generating and storing sound profiles from at least one known noise source, and adjusting the noise cancellation signals to generate the inverse sound waves based on the stored sound profiles from the at least one known noise source.

BRIEF DESCRIPTION OF THE DRAWINGS

The foregoing aspects and many of the attendant advantages of this invention will become more readily appreciated as the same become better understood by reference to the following detailed description when taken in conjunction with the accompanying drawings.

Figure 1:
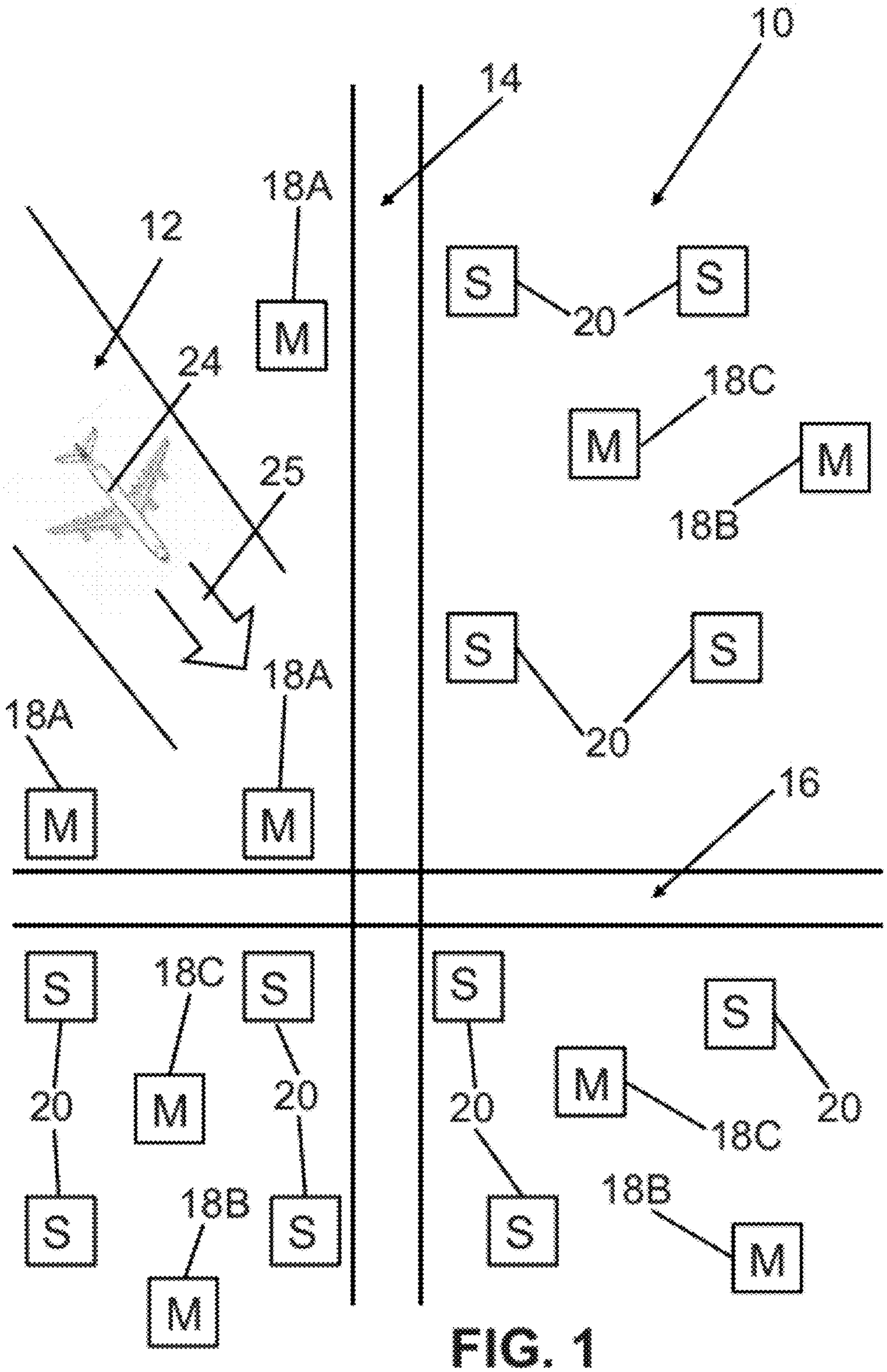
FIG. 1 is a diagrammatical view illustrating a wide area noise cancellation system of the present disclosure located adjacent in airport runway.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates embodiments of the invention, and such exemplifications are not to be construed as limiting the scope of the invention in any manner.

DETAILED DESCRIPTION OF THE DRAWINGS

For the purposes of promoting an understanding of the principles of the invention, reference will now be made to the embodiments illustrated in the drawings, which are described below. The embodiments disclosed below are not tended to be exhaustive or limit the invention to the precise form disclosed in the following detailed description. Rather, the embodiments are chosen and described so that others skilled in the art may utilize their teachings. It is understood that no limitation of the scope of the invention is thereby intended. The invention includes any alterations and further modifications in the illustrated devices and described methods and further applications of the principles of the invention which would normally occur to one skilled in the art to which the invention relates.

Figure 3:
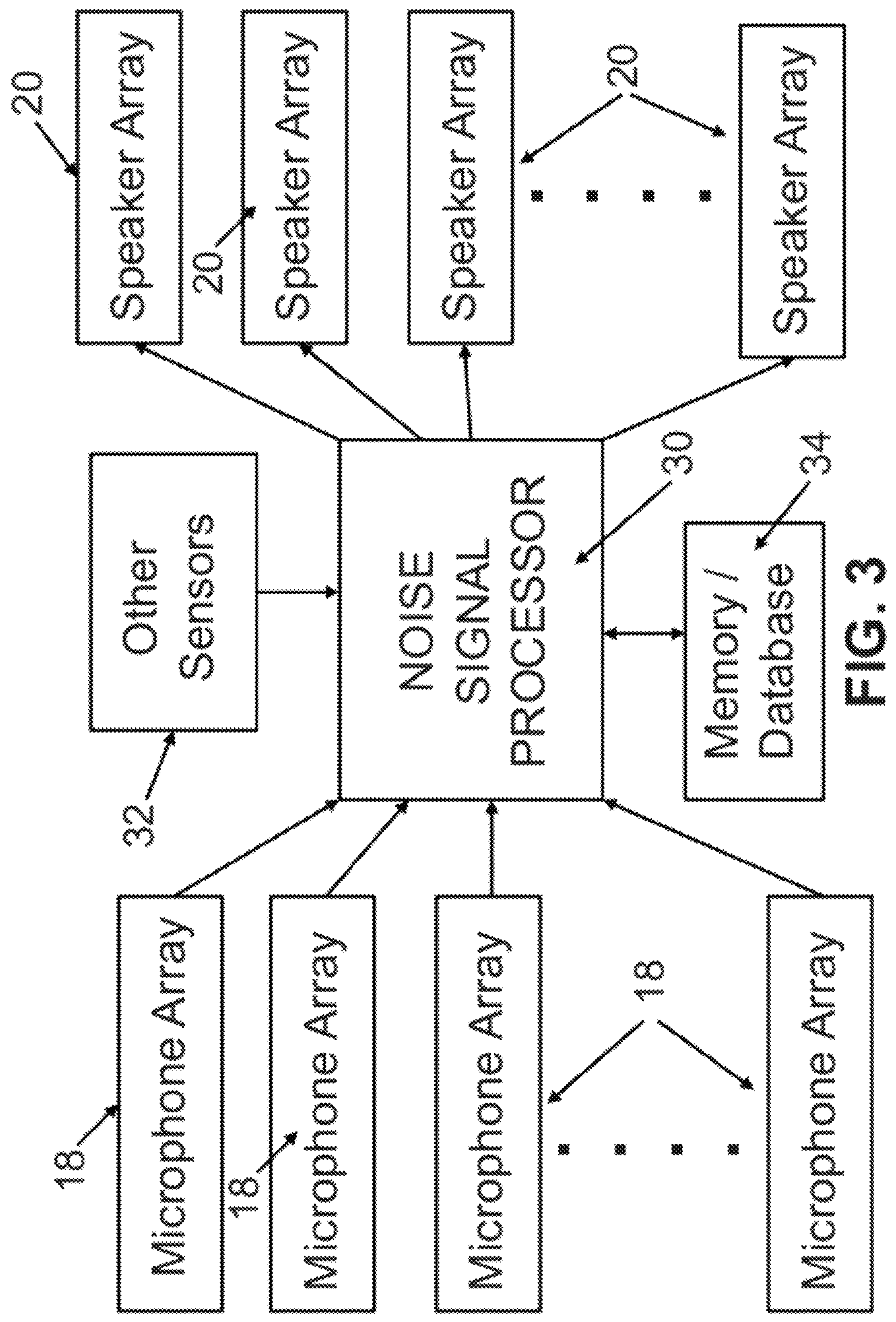
FIG. 3 is a block diagram illustrating components of the noise cancellation system of the present disclosure including the plurality of microphone arrays, a noise signal processor, and a plurality of speaker arrays.

Referring initially to FIG. 1, an open-air wide area noise cancellation system 10 is illustrated in an area surrounding a noise source such as an airport 12. In FIG. 1, roads 14 and 16 are shown near the airport 12. The wide area noise cancellation system 10 includes a plurality of microphone arrays 18 and a plurality of speaker arrays 20 strategically placed at spaced apart locations throughout neighborhoods surrounding the airport 12. A first group of microphone arrays 18A are located near the airport runway. The first group of microphone arrays 18A detect noise from airplanes 24 moving in the direction of arrow 25 during takeoff of the airplane 25. An outer group of microphone arrays 18B detects noise from airplanes 24 approaching the airport runway for landing in a direction opposite to arrow 25. Central microphone arrays 18C are interspersed throughout the neighborhood surrounding the airport 12. Microphone arrays 18A-C detect noise from noise sources such as airplane 25. Signals from the microphone arrays 18A-C are provided to a central noise signal processor 30 as shown in FIG. 3.

The noise signal processor 30 evaluates output signals from the microphone arrays 18 indicative of the detected noise from the noise source. Processor 30 determines the inverse sound waves necessary to cancel or reduce the effect of noise from the airplane 25 in a conventional manner. Typically, the inverse sound waves are 180 degrees out of phase with the sound from the noise source to cancel the noise. In the embodiment of FIG. 1, noise processor 30 provides individualized signals to each speaker array 20 necessary to produce the inverse sound waves to reduce or cancel the noise from airplane 25 within the neighborhoods adjacent the airport 12.

Figure 2:
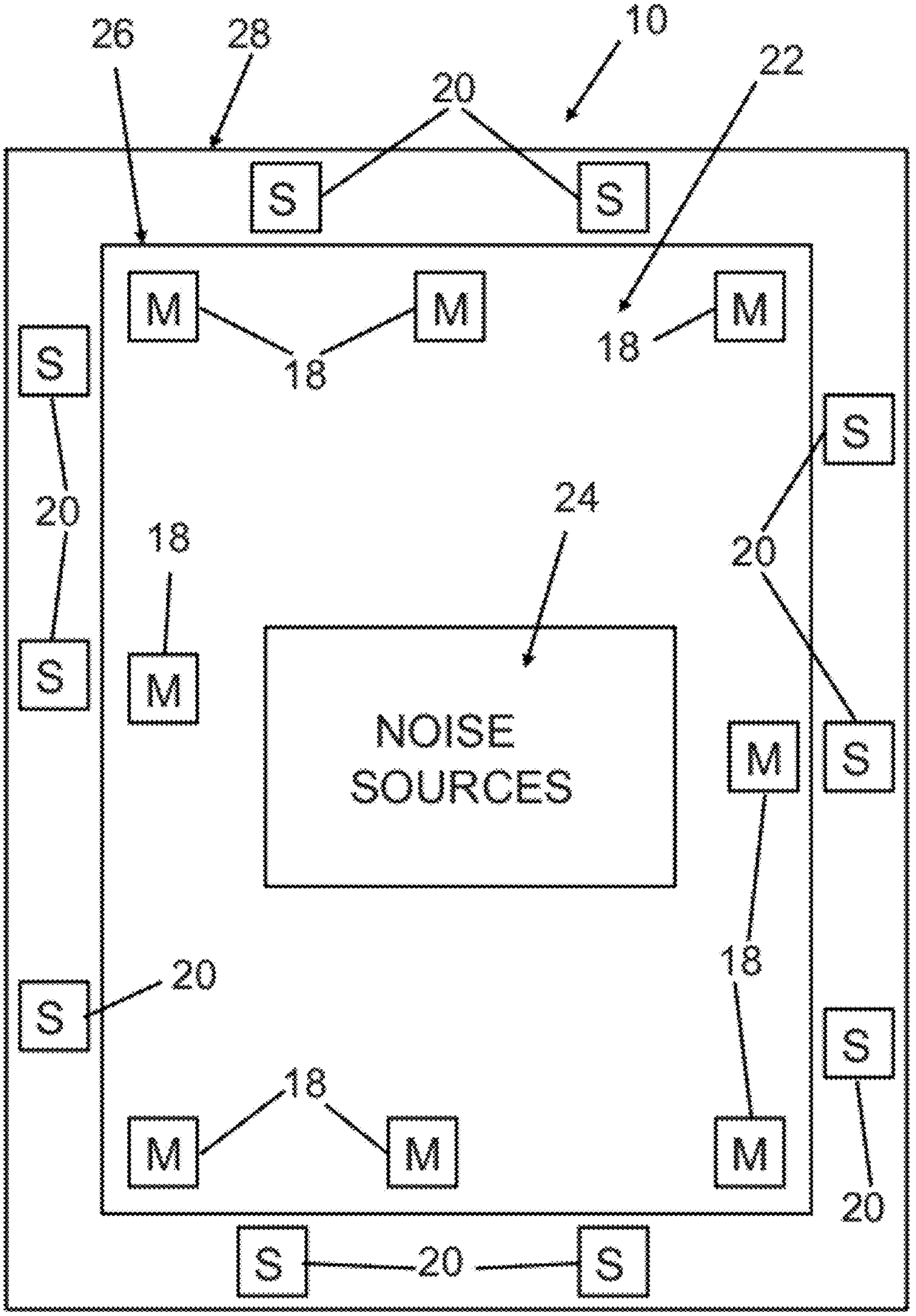
FIG. 2 is another embodiment of the present disclosure in which the wide area noise cancellation system and method is used to cancel noise sources within a predetermined area such as a military base, factory or construction site, for example.

Another embodiment of the present disclosure is illustrated in FIG. 2. In this embodiment, the wide area noise cancellation system 10 is configured to reduce or cancel noise from noise sources 24 within a noise producing area or zone 22. In certain illustrated embodiments, the noise producing area 22 is a military base, a construction site, a factory, a sporting venue such as a race track or other area in which noise reduction is desirable. The noise producing area 22 may include first and second protective fences 26 and 28 designed to secure the noise producing area such as the military base. In illustrated embodiments, the fences 26 and 28 are secure barbed-wire or razor-wire fences which permit sound to pass through but deter people from entering the area 22.

A plurality of microphone arrays 18 are spaced apart around a perimeter of area 22 defined by inner fence 26 surrounding the noise sources 24. The microphone arrays 18 detect noises from noise sources 24 within the area 22 and provide the detected noise signals to a central processor 30. The central processor 30 processes the detected noise signals, determines the positions and any movement of the noise sources 24, and determines the inverse sound waves necessary to substantially reduce or cancel the noise from noise sources 24. Processor 30 then provides individualized signals to drive a plurality of speaker arrays 20 to optimize cancellation of the noise from noise sources 24. In the illustrated embodiment, the speaker arrays 20 are spaced apart and surround the perimeter of the noise producing area 22. For example, in one embodiment the speaker arrays 20 are located between the first and second fences 26 and 28.

Inverse sound waves generated by the speaker arrays 20 substantially reduce or cancel noise from noise sources 24 before noise exits the noise producing area 22 or as the noise is exiting the area. For military base applications, people located outside the noise producing area 22 cannot hear activities or maneuvers taking place on the military base. For construction sites, factories, race tracks, or the like surrounding areas have substantially reduced noise levels to minimize the noise pollution impact of the construction sites or factories on nearby locations.

FIG. 3 illustrates the plurality of microphone arrays 18 coupled to the central noise signal processor 30. The central noise signal processor 30 is configured to process signals from the microphone arrays 18, determine appropriate noise cancellation signals, and generate signals to drive each of the speaker arrays 20 to substantially reduce or cancel noise from noise sources.

In certain illustrated embodiments, other location indicators or sensors 32 are provided to facilitate locating the noise sources. For instance, transponder data or GPS data from moving objects such as airplanes or radar data may be provided as inputs to the noise signal processor 30 to facilitate detection of the location of the noise source 24 such as airplane 25. Noise signal processor 30 is also coupled to a computer memory 34 to provide a database to facilitate processing of the noise signals and generating the inverse wave forms for driving the speaker arrays 20 as discussed below. In other embodiments, temperature and humidity sensors 32 provide data to processor 30.

Figure 4:
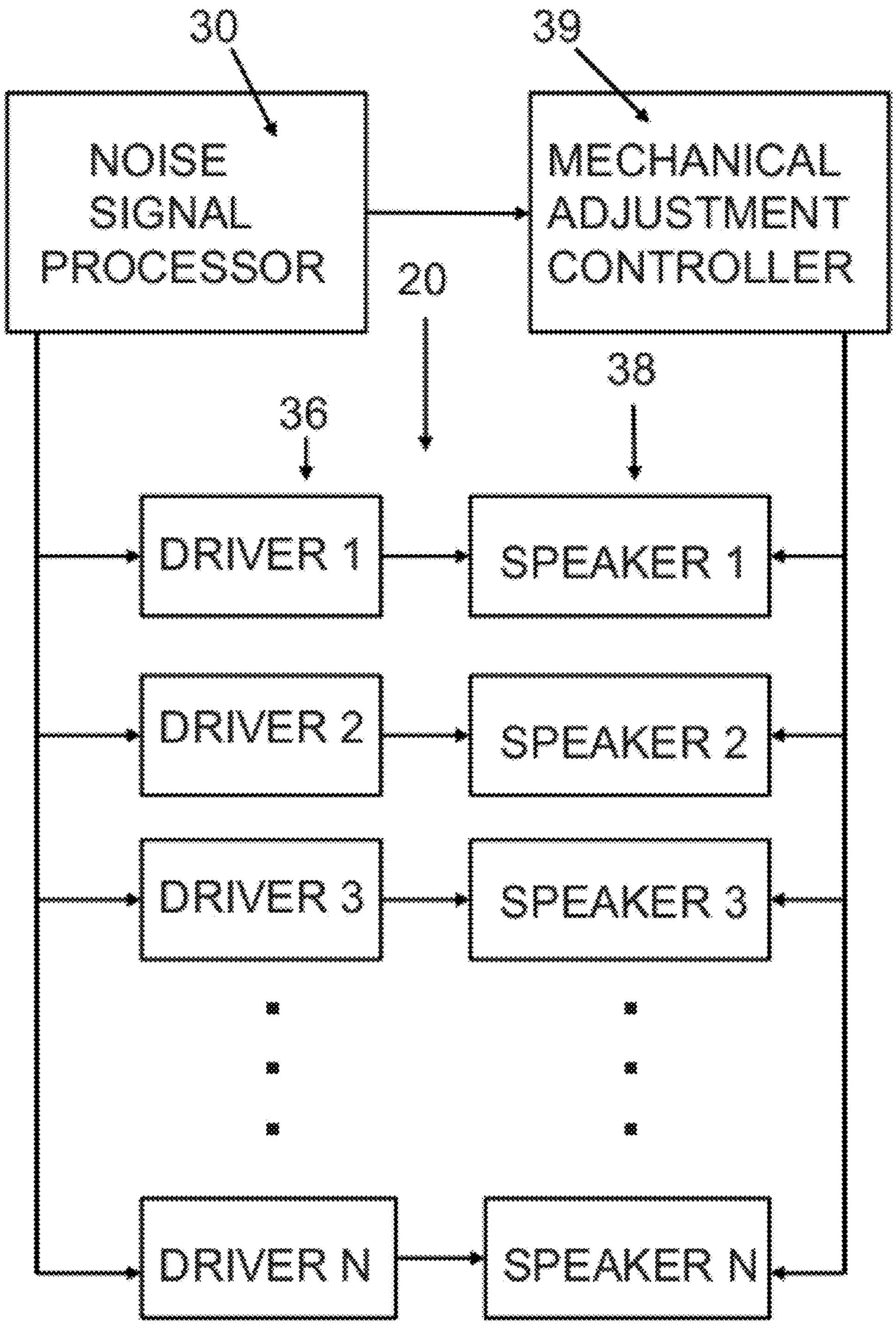
FIG. 4 is an illustrated embodiment of one of the speaker arrays coupled to the noise signal processor and coupled to a mechanical adjustment control to alter a position or orientation of individual speakers within the speaker array.

FIG. 4 illustrates the noise signal processor 30 and one exemplary embodiment of a speaker array 20. Each speaker array 20 illustratively includes a plurality of separate drivers 36 and coupled to the noise signal processor 30 and separate speakers 38 provide a directional speaker array 20. In one illustrated embodiment, speakers 38 provide an omni-directional speaker array 20 with 360 degrees of coverage. Multiple speakers 38 may be aligned at different angles, such as every 90° or so around a mounting post to provide the 360° sound coverage from the speaker arrays 20.

In an illustrated embodiment, the speaker arrays 20 are high quality outdoor speaker arrays such as warning sirens or stadium speakers. As discussed above, each speaker array 20 includes a plurality of speakers 38 to transmit sound waves in any desired direction away from the speaker array 20. Depending on the application, only certain speakers 38 in the speaker array 20 may be driven to provide directional sound waves from the speaker array 20 as discussed below. The speaker arrays 20 are positioned throughout a neighborhood or desired coverage area to minimize sound wave overlap from the other speaker arrays 20, but to ensure maximum coverage of the entire desired noise cancellation area. In illustrated embodiments, the speaker arrays 20 may be directional speaker arrays or modulator series speaker arrays available from Federal Signal Corporation located in University Park, Ill., for example. It is understood that any other suitable speaker array 20 may also be used.

FIG. 4 also illustrates a mechanical adjustment controller 39 coupled to speakers 38 and coupled to noise signal processor 30. In one embodiment, speakers 38 are located in a fixed position during installation. In another embodiment, the location and orientation of the speakers 38 are adjustable by mechanical adjustment controller 39 based on the desired inverse wave signals. Controller 39 illustratively provides both vertical height adjustment and angular orientation adjustment (side to side and/or up and down) of the speakers 38 relative to a mounting structure.

Illustratively, the microphone arrays 18 include at least 3-4 microphones arranged to detect directional vectors for the noise sources. The microphones in each array 18 are illustratively arranged in a triangular or pyramidal configuration. The Doppler effect may be used to locate the noise source. By using multiple microphone arrays 18 each including multiple microphones, the noise signal processor 30 processes the detected noise signals to generate a three dimensional (3D) noise picture associated with sounds produced by a noise source. The processor 30 processes the 3D noise picture to detect a peak signal and determine a motion vector from each of the microphone arrays 18.

Figure 5:
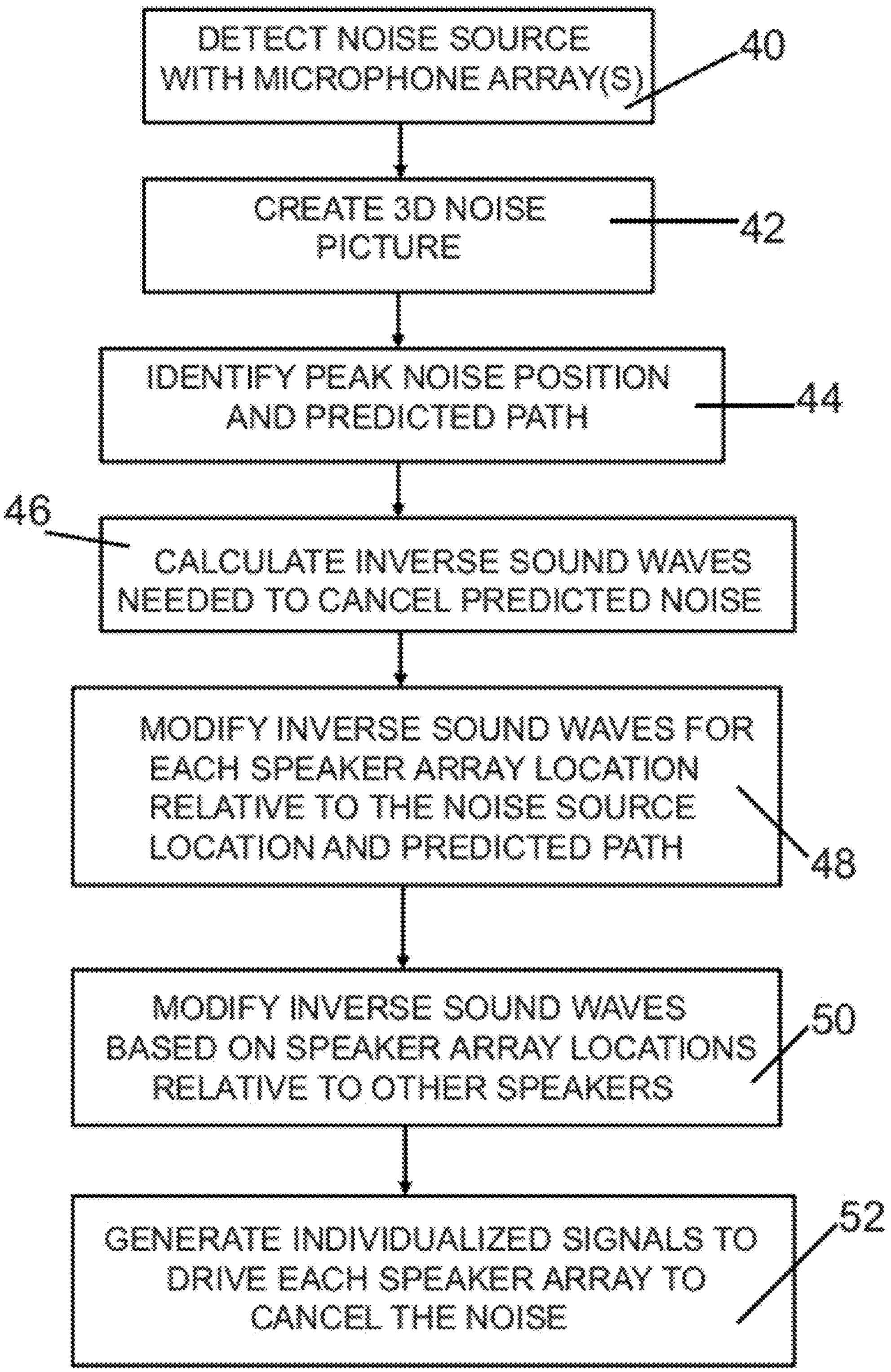
FIG. 5 is a flow chart illustrating the steps performed by the wide area noise cancellation system to detect noise produced by noise sources and generate signals to drive each speaker array to cancel or reduce the noise in areas surrounding the speaker arrays.

In one illustrated embodiment disclosed in FIG. 5, sounds from at least one noise source 24, 25 are detected with the plurality of microphone arrays 18 as illustrated at block 40. The noise signal processor 30 processes the output signals from the microphone arrays 18 to create a 3D noise picture of the noise generated by the noise sources 24, 25 as illustrated at block 42. Processor 30 then identifies a peak noise location and a predicted path for a moving noise source as illustrated at block 44. Next, processor 30 calculates the inverse sound waves needed to cancel the predicted noise as the noise source moves along the predicted path as illustrated at block 46.

The processor 30 modifies the inverse sound waves for each speaker array 20 location relative to the noise source location and the predicted path as illustrated at block 48. A location of each of the speaker arrays 20 is stored in database 34. Therefore, processor 30 knows the locations for each speaker array 20 within a noise cancellation area relative to the detected noise source. The processor 30 modifies the phase and/or frequency of the inverse sound waves for each particular speaker array 20 based on its location relative to the determined location of the noise source and the predicted path of the noise source. In addition, processor 30 modifies the inverse sound waves based on the locations of speaker arrays 20 relative to each other as illustrated at block 50. After the necessary inverse sound waves for each speaker array 20 are calculated, the processor 30 generates individualized signals to drive speakers 38 within each speaker array 20 to reduce or cancel the noise from the noise source as illustrated at block 52.

Figure 6:
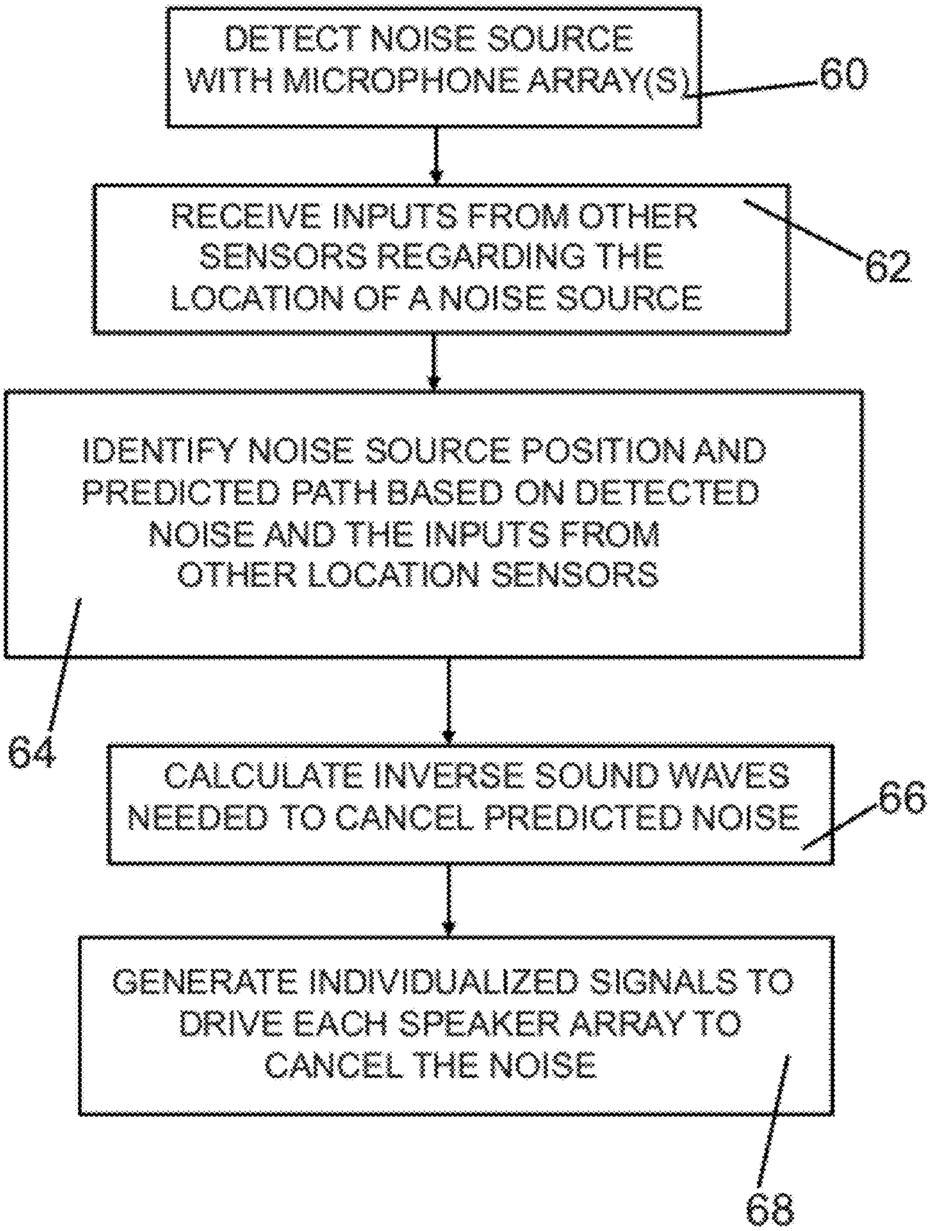
FIG. 6 is a flow chart illustrating the steps performed by the wide area noise cancellation system to detect a location of a noise source and predict a path of movement of the noise source based upon sounds detected by the microphone arrays and upon inputs from other sensors indicating a location of the noise source, and then generating the individualized signals to drive each speaker array to cancel or reduce the noise.

As discussed above, in certain illustrated embodiments, inputs from other location indicators or sensors 32 are provided to the central noise signal processor 30 to assist with the location of the noise sources 24, 25 and the calculation of the predicted paths for the noise sources 24, 25. Humidity or temperature sensor inputs may also be used to alter the inverse sound waves. The use of inputs from other sensors 32 is illustratively shown in FIG. 6. Sounds from a noise source 24, 25 are detected using the plurality of microphone arrays 18 as illustrated at block 60. In addition, inputs from other sensors 32 regarding the location of a noise source 24, 25 are received by the central noise processor 30 as illustrated at block 62. For instance, transponder data, GPS data or radar location data may be provided to the processor 30 to assist with locating and tracking movement of the noise source 24, 25.

Using both the signals detected by the microphone arrays 18 and the signals from other indicators or sensors 32, processor 30 identifies the location of the noise source 24, 25 and determines a predicted path for the noise source as illustrated at block 64. Next, processor 30 calculates the inverse sound waves needed to cancel the predicted noise as illustrated at block 66. Processor 30 then generates individualized signals to drive each speaker array 20 to cancel or reduce the noise from the noise sources 24, 25 as illustrated at block 68.

In certain instances, such as near airports or construction zones, noises are often repeated by the noise sources 24, 25 at different times. For instance, airplanes 25 taking off or landing have distinct sound profiles which may be recorded and stored in database 34 for future reference. Different airplanes 25 having different engines produce different sound profiles. Flap settings on the airplanes 25 during takeoff and landing are a significant cause of noise. By recording and storing sound profiles associated with certain reoccurring noise events, such as airplanes 25 taking off and landing, the signal processor 30 can use the recorded sound profiles to help predict expected sound profiles and paths of movement for newly detected noise sources. In addition, certain equipment within construction sites or factories may produce sound profiles which can be recorded and stored in database 34 to facilitate with the determination of the inverse sound waves for noise cancellation.

Figure 7:
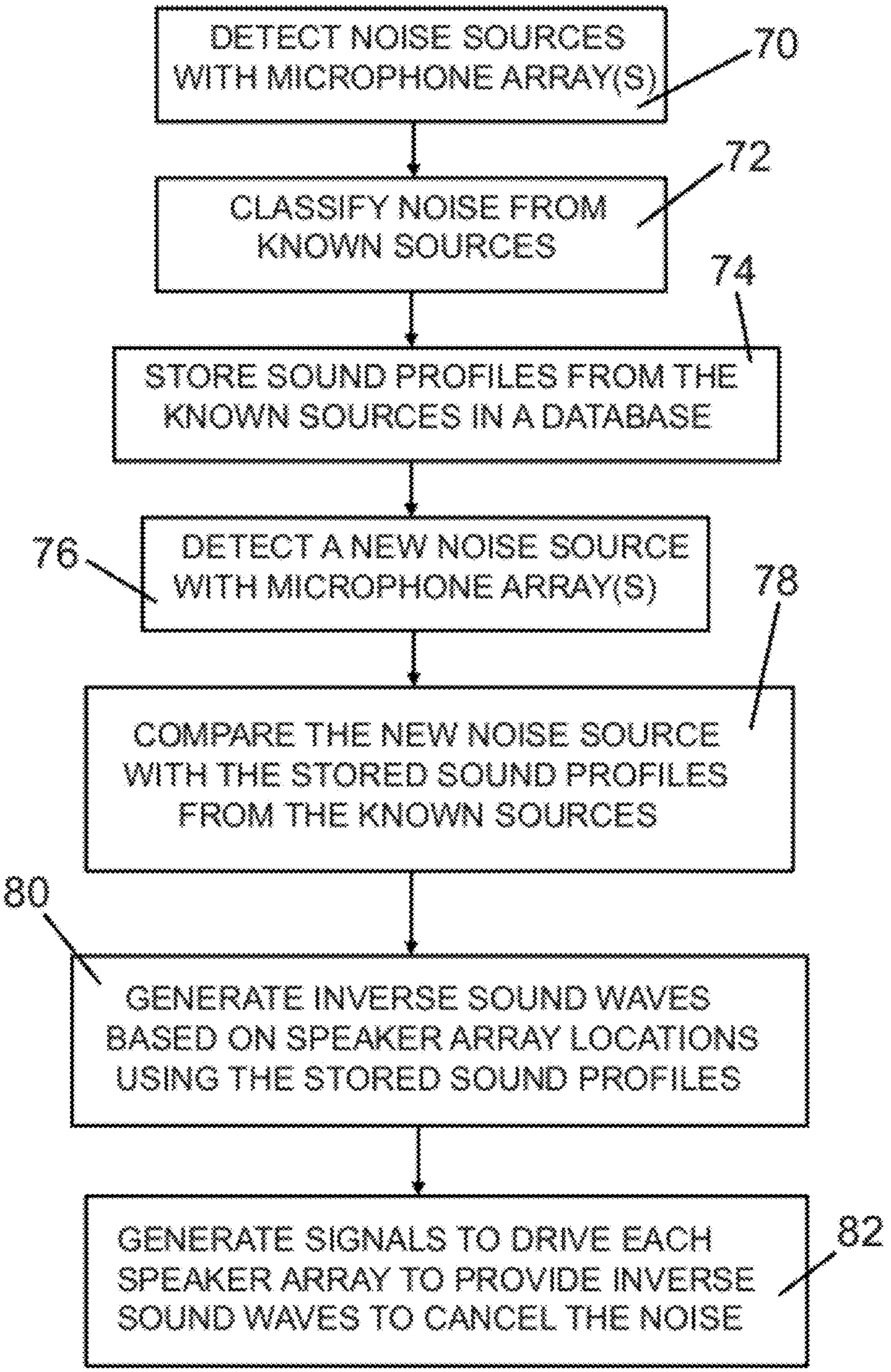
FIG. 7 is a flow chart illustrating steps performed by the wide area noise cancellation system to store sound profiles from known noise sources in a database and use the stored sound profiles to identify new noise sources and generate the signals to cancel or reduce the noise.

FIG. 7 illustrates the classification of sounds from known noise sources and the use of such stored noise data to facilitate noise cancellation. In this embodiment, noise from noise sources 24, 25 is detected with the plurality of microphone arrays 18 as illustrated at block 70. Noise profiles including peak noise levels at different frequencies are tracked, recorded and classified as the noise source moves along a path as illustrated at block 72. Processor 30 generates sound profiles and stores the sound profiles from the known noise sources in database 34 for future reference as illustrated at block 74. Next, a new noise source is detected using microphone arrays 18 as illustrated at block 76. Processor 30 compares sounds generated by the new noise source with the stored sound profiles from known noise sources is illustrated at block 78. Using this comparison, processor 30 generates inverse sound waves based on speaker array 20 locations as illustrated at block 80. Next, processor 30 generates signals to drive each speaker array 20 to provide inverse sound waves to reduce or cancel the detected and/or predicted noise from the new noise source as illustrated at block 82.

Figure 8:
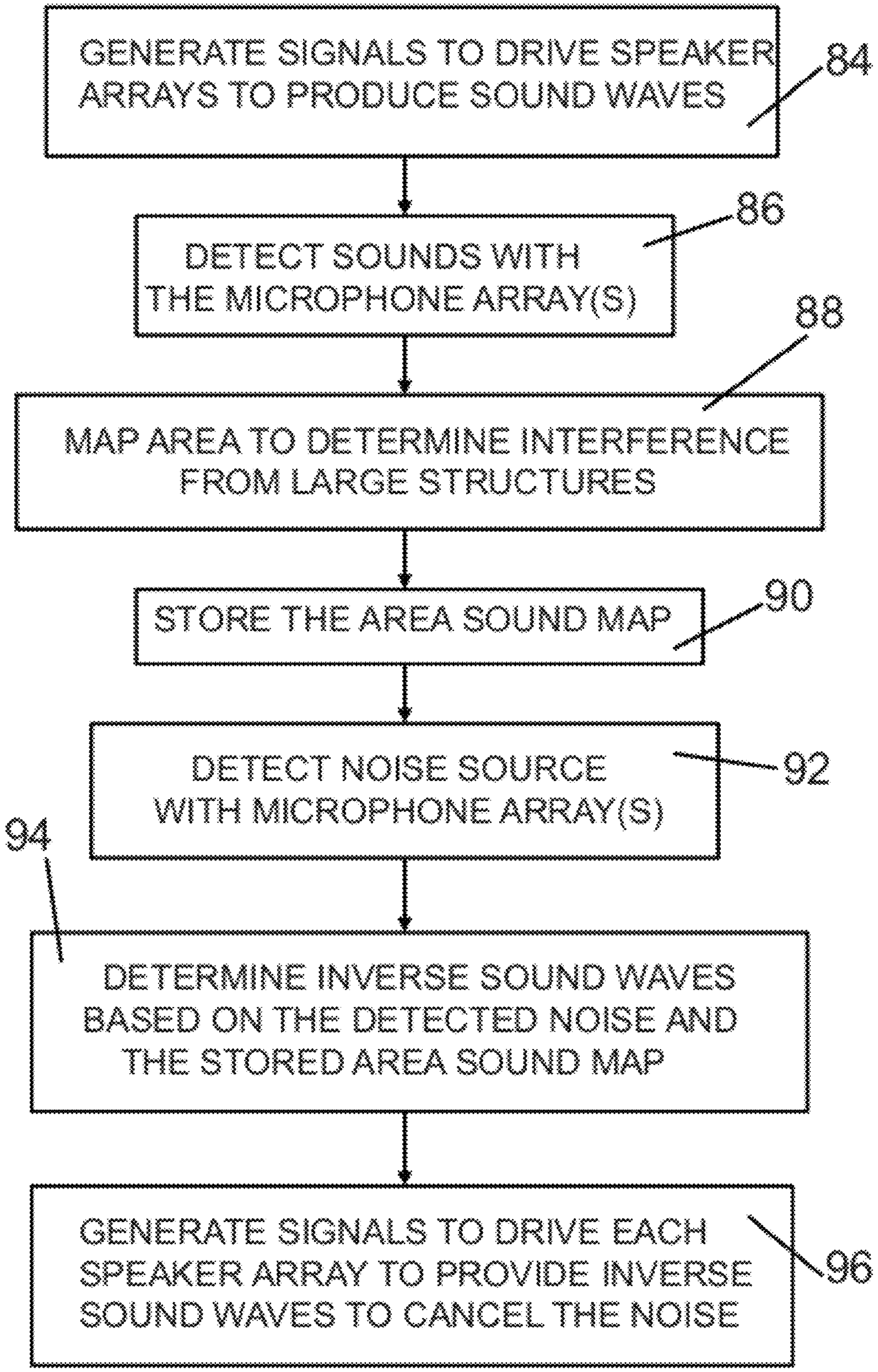
FIG. 8 is a flow chart illustrating steps performed by the wide area noise cancellation system to map an area to determine sound interference from large structures or geographic features and then use the stored sound map when generating the signals to drive each speaker array to cancel or reduce detected noises.

When installing the wide area noise cancellation system 10 within a neighborhood or desired area, large structures or certain geographic features impact the way sound travels through the noise cancellation area. During installation, the system 10 determines the impact of these geographic features or large structures on system performances as shown in FIG. 8. Processor 30 is used to generate signals to drive speaker arrays 20 to produce known calibration sound waves as illustrated at block 84. The calibration sound waves are detected with the plurality of microphone arrays 18 as illustrated at block 86. Processor 30 then maps the area to compare actual sounds received by the microphone arrays at block 86 with the predicted sounds that should have been received based on the signals provided to the speaker arrays 20. Processor 30 maps the noise cancellation area to determine areas of interference from the large structures or geographic features of the region as illustrated at block 88. Processor 30 then stores the area sound map in the database 34 as illustrated at block 90.

Next, a new noise source is detected with the plurality of microphone arrays 18 as illustrated at block 92. Processor 30 determines the desired inverse sound waves based on the detected noise, including the noise location and predicted path, and using the stored area sound map as illustrated at block 94. In other words, the processor 30 makes adjustments to the inverse sound waves based upon the pre-determined interference from large structures or geographical features within the noise cancellation area. Next, processor 30 generates signals to drive each speaker array 20 to provide inverse sound waves to reduce or cancel the noise from the noise source as illustrated at block 96.

While the illustrated embodiments use the stored sound maps of interference patterns for reducing the noise from noise sources, the stored interference maps are used in another embodiment to alter sound waves produced by the speaker arrays 20 for producing warning sirens, public address messages or other acoustic signals to improve sound quality in the area around speaker arrays 20. In one illustrated embodiment, speaker arrays 20 are giant voice speakers.

Figure 9:
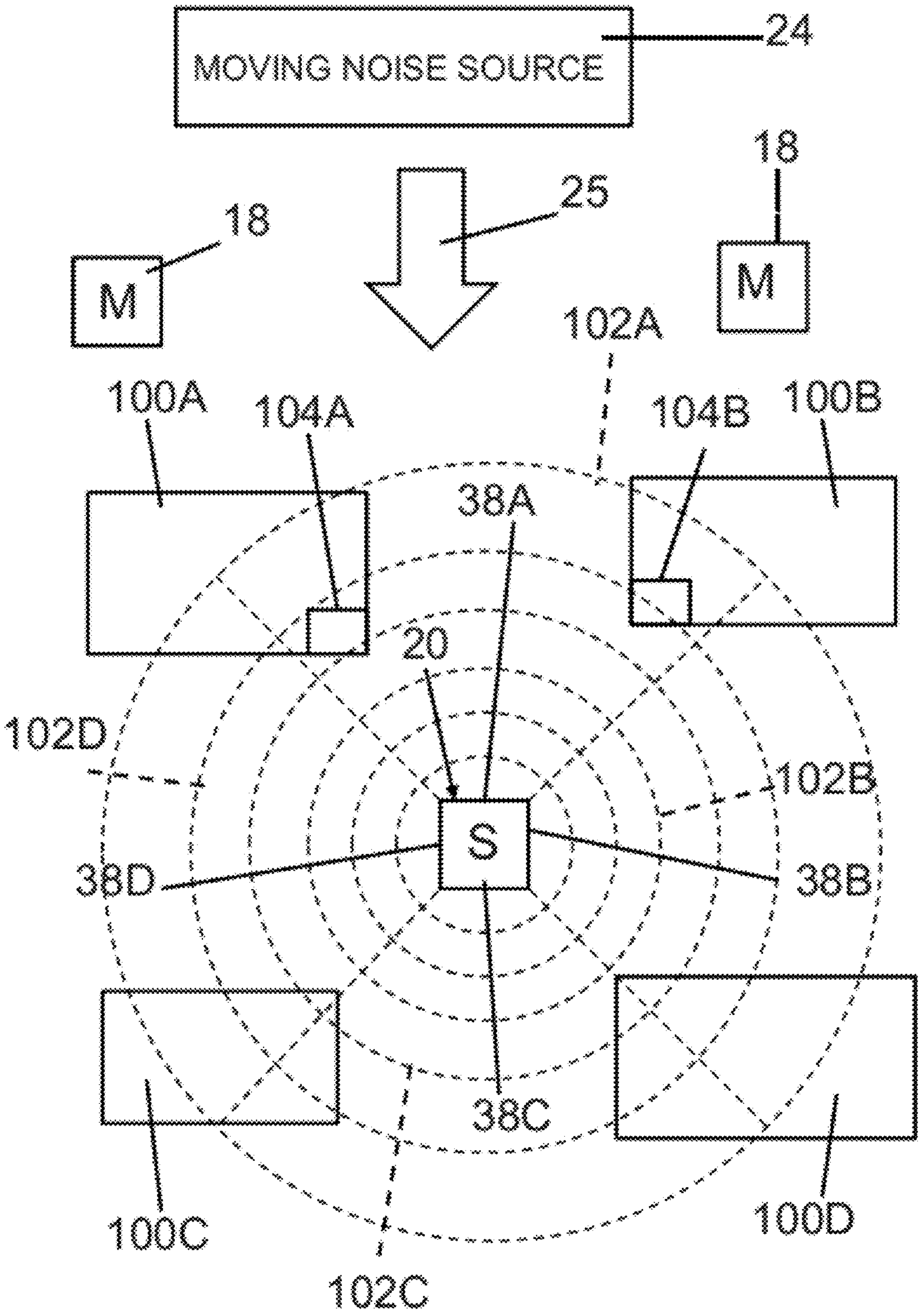
FIG. 9 is a diagrammatical view illustrating operation of the wide area noise cancellation system to detect and cancel or reduce noise from a noise source before it reaches a speaker array located near homes or businesses within an area covered by the noise cancellation system.

The multidirectional or omni-directional speaker arrays 20 are particularly effective at cancelling noise from moving noise sources 24, 25 before the noise reaches the speaker array 20. In one illustrated embodiment shown in FIG. 9, a noise source 24 is moving in the direction of arrow 25 toward microphone arrays 18. A speaker array 20 is located within a noise cancellation area next to buildings 100A-100D. In the illustrated embodiment, the speaker array 20 of FIG. 9 includes separately facing, adjustable speakers 38A, 38B, 38C, and 38D. Speakers 38A, 38B, 38C, and 38D emit sound waves directionally as shown by diagrammatic wave patterns 102A, 102B, 102C, and 102D, respectively. In other words, each speaker 38A, 38B, 38C, and 38D emits sound waves covering about a 90 degree coverage area from speaker array 20.

The microphone arrays 18 detect noise from the moving noise source 24 and provide the received signals to central noise signal processor 30 as discussed above. The noise signal processor 30 determines the location of the noise source 24 and calculates a predicted path of movement of the noise source shown by arrow 25. The processor 30 generates signals to drive speaker(s) 38A of speaker array 20 to produce inverse sound waves directionally as shown by waves 102A to cancel the noise from moving noise source 20 before the noise source 24 reaches the speaker array 20 shown in FIG. 9. Therefore, the noise from noise source 24 may be reduced or cancelled at buildings 100A and 100B, even though these buildings are located between the moving noise source 24 and the speaker array 20. In other noise cancellation systems, the noise is not cancelled or reduced until the sound waves have passed a noise cancellation speaker. The speaker arrays 20 provide 360 degrees of noise cancellation capability without requiring the use of noise blocking walls or other sound proof structures used in conjunction with the speaker arrays 20. This reduces the expense of installing the wide area noise cancellation system 10.

In certain embodiments, additional speakers or adjustable sound reflectors 104A, 104B are located on certain buildings 100A, 100B, respectively. In an illustrated embodiment of the present invention, the noise signal processor 30 adjusts the position and/or angular orientation of speakers 38A using the mechanical adjustment controller 39 to form and guide the inverse sound wave 102A generated by speaker 38A. In addition, a noise signal processor 30 may provide input signals to speakers or adjustable sound reflectors 104A, 104B to help guide or steer the inverse sound wave 102A toward the optimal location to cancel the noise from moving noise source 24. Adjustable or non-adjustable sound reflectors or sound absorbers 104A, 104B may be used on the buildings 100A, 100B to help minimize sound reflections or interference to focus and steer the sound waves 102A toward the noise source 24.

While embodiments of the present disclosure have been described as having exemplary designs, the present invention may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this invention pertains.

The invention claimed is:

1. A wide area noise cancellation system for reducing the effect of noise generated by at least one noise source within a noise producing area at locations outside the noise producing area, the system comprising:

a plurality of spaced apart microphone arrays positioned within the noise producing area, each microphone array detecting noise from at least one noise source located in the noise producing area and generating an output signal indicative of the detected noise;

a noise signal processor configured to receive the output signals from the plurality of microphone arrays, the processor processing the output signals to determine noise cancellation signals to reduce the effect of noise from the at least one noise source; and a plurality of speaker arrays located at spaced apart locations around a periphery of the noise producing area, the plurality of speaker arrays receiving the noise cancellation signals from the processor and generating inverse sound waves to reduce the effect of the noise from the at least one noise source before the noise from exits the noise producing area;

wherein the noise signal processor generates signals to drive the at least one speaker array to produce calibration sound waves, the calibration sound waves being detected by the at least one microphone array, the processor processing output signals from the at least one microphone array representing the detected calibration sound waves to determine areas of sound interference within a noise producing area, and wherein the processor adjusts the determined inverse sound wave based on the determined areas of sound interference within the noise producing area.

2. The system of claim 1, wherein the plurality of microphone arrays are spaced apart around a perimeter of noise producing area, and the plurality of speaker arrays are spaced apart around the perimeter of noise producing area at locations radially outwardly from the locations of the plurality of microphone arrays.

3. The system of claim 2, wherein inner and outer fences surround the noise producing area, the plurality of microphone arrays being located inside the inner fence and the plurality of speaker arrays being located between the inner and outer fences.

4. The system of claim 1, wherein the noise producing area is a military base.

5. The system of claim 1, wherein the noise producing area is a construction site.

6. The system of claim 1, wherein the noise producing area is a factory.

7. The system of claim 1, wherein each microphone array includes at least three microphones.

8. The system of claim 7, wherein each microphone array includes four microphones arranged in a pyramidal configuration.

9. The system of claim 1, wherein the plurality of speaker arrays generate the inverse sound waves to reduce the effect of the detected noise without the use of noise blocking walls.

10. The system of claim 1, wherein noise from a plurality of known noise sources is detected with the plurality of microphone arrays, and wherein the processor generates and stores sound profiles based on the noise from the known noise sources, the processor adjusting the noise cancellation signals used to generate the inverse sound waves based on the stored sound profiles from known noise sources.

11. The system of claim 1, wherein a plurality of speakers of each speaker array include a separate driver configured to receive a noise cancellation signal from the processor so that the processor separately drives speakers of the speaker array.

12. The system of claim 1, wherein each speaker array includes a plurality of separate directional speakers angularly spaced around a mounting structure to provide substantially 360° coverage for inverse sound waves produced by the speaker array.

13. The system of claim 12, wherein each speaker array includes four separate speakers angularly spaced apart by about 90° on the mounting structure, the speakers being separately drivable to provide directional noise cancellation inverse sound waves.

14. The system of claim 12, wherein the plurality of directional speakers of each speaker array are adjustable in height and angular orientation, and further comprising a mechanical adjustment controller configured to selectively adjust the height and angular orientation of the plurality of directional speakers, the mechanical adjustment controller being coupled to the noise signal processor, the noise signal processor sending signals to adjust the height and angular orientation of the directional speakers based upon the determined inverse sound waves necessary to reduce the effect of the detected noise.

15. The system of claim 1, wherein the processor processes the output signals from the plurality of microphone arrays to determine a location of the at least one noise source, the processor adjusting a phase and a frequency of the inverse sound waves based on the location of the speaker arrays relative to the location of the noise source.

16. A method for reducing the effect of noise generated by at least one noise source within a noise producing area at locations outside the noise producing area, the method comprising:

providing a plurality of speaker arrays located at spaced apart locations around a periphery of the noise producing area;

detecting noise from the at least one noise source located in the noise producing area;

determining noise cancellation signals based on the detected noise to reduce the effect of noise from the at least one noise source;

driving the plurality of speaker arrays with the noise cancellation signals to generate inverse sound waves to reduce the effect of the noise from the at least one noise source; and generating calibration sound waves with the at least one speaker array; detecting the calibration sound waves; determining areas of sound interference within a noise cancellation area; and adjusting the noise cancellation signals based on the determined areas of sound interference within the noise cancellation area.

17. The method of claim 16, wherein the plurality of speaker arrays generate the inverse sound waves to reduce the effect of the detected noise without the use of noise blocking walls.

18. The method of claim 16, further comprising generating and storing sound profiles from at least one known noise source; and adjusting the noise cancellation signals to generate the inverse sound waves based on the stored sound profiles from the at least one known noise source.

19. The method of claim 16, further comprising determining a location of the at least one noise source using the detected noise, and adjusting a phase and a frequency of the inverse sound waves based on the location of the speaker arrays relative to the location of the noise source.

20. The method of claim 16, wherein each speaker array includes a plurality of separate directional speakers angularly spaced around a mounting structure to provide substantially 360° coverage for inverse sound waves produced by the speaker array, and further comprising adjusting at least one of a height and an angular orientation of the plurality of directional speakers of the at least one speaker array based on the inverse sound waves necessary to reduce the effect of the detected noise.

21. A wide area noise cancellation system for reducing the effect of noise generated by a noise source, the system comprising:

at least one speaker array, each speaker array including a plurality of directional speakers arranged to provide a plurality of sound wave coverage patterns that together provide substantially 360° coverage for sound waves produced by the speaker array;

at least one microphone array configured to detect noise from the noise source before the noise reaches the at least one speaker array, each microphone array generating an output signal indicative of the noise detected from the noise source; and a noise signal processor configured to receive the output signals from the at least one microphone array, the processor processing the output signals to determine a location of the noise source, to determine inverse sound waves based on the output signals, and to generate noise cancellation signals to drive at least one directional speaker within the at least one speaker array so that the at least one directional speaker generates the inverse sound waves directed towards a noise source to reduce the effect of the detected noise from the noise source before the noise reaches the location of the at least one speaker array;

wherein the processor generates signals to drive the at least one speaker array to produce calibration sound waves, the calibration sound waves being detected by the at least one microphone array, the processor processing output signals from the at least one microphone array representing the detected calibration sound waves to determine areas of sound interference within a noise cancellation area.

22. The system of claim 21, wherein the noise source is a moving noise source, and wherein the processor determines the location and a predicted path of the moving noise source based on the output signals received from the at least one microphone array.

23. The system claim 22, wherein the location and the predicted path of the moving noise source are used along with the output signals from the at least one microphone array to determine the inverse sound wave and to determine which of the direction speakers of the at least one speaker array to drive.

24. The system of claim 22, wherein the at least one speaker array generates the inverse sound wave to reduce the effect of the detected noise without the use of noise blocking walls.

25. The system of claim 22, wherein the processor adjusts a phase and a frequency of the inverse sound waves based on the location of the at least one speaker array relative to the location and the predicted path of the noise source.

26. The system of claim 22, wherein the processor also receives signals from at least one location indicator to assist the processor with determining the location and the predicted path of the noise source.

27. The system of claim 26, wherein the location indicator is one of a transponder, a GPS device, and a radar device.

28. The system of claim 21, wherein the processor adjusts the determined inverse sound wave based on the determined areas of sound interference within the noise cancellation area.

29. The system of claim 21, wherein noise from a plurality of known noise sources is detected with the at least one microphone array, and wherein the processor generates and stores sound profiles based on the noise from the known noise sources, the processor adjusting the noise cancellation signals used to generate the inverse sound waves based on the stored sound profiles from known noise sources.

30. The system of claim 21, wherein the plurality of directional speakers of each speaker array include a separate driver configured to receive a noise cancellation signal from the processor so that the processor separately drives directional speakers of the speaker array.

31. The system of claim 21, wherein a plurality of speaker arrays are spaced apart to minimize overlap of sound waves produced by the speaker arrays while maximizing coverage of a noise cancellation area.

32. The system of claim 21, wherein each speaker array includes a plurality of separate speakers angularly spaced around a mounting structure to provide the 360° coverage for sound waves produced by the speaker array.

33. The system of claim 32, wherein each speaker array includes four separate speaker banks angularly spaced apart by about 90° on the mounting structure.

34. The system of claim 21, wherein each microphone array includes at least three microphones to produce a triangulation of the noise source.

35. The system of claim 34, wherein each microphone array includes four microphones arranged in a pyramidal configuration.

36. The system of claim 21, wherein the plurality of directional speakers of each speaker array are adjustable in height and angular orientation, and further comprising a mechanical adjustment controller configured to selectively adjust the height and angular orientation of the plurality of directional speakers, the mechanical adjustment controller being coupled to the noise signal processor, the noise signal processor sending signals to adjust the height and angular orientation of the directional speakers based upon the determined inverse sound waves necessary to reduce the effect of the detected noise.

37. A wide area noise cancellation system for reducing the effect of noise generated by a noise source, the system comprising:

at least one speaker array, each speaker array including a plurality of directional speakers arranged to provide a plurality of sound wave coverage patterns that together provide substantially 360° coverage for sound waves produced by the speaker array;

at least one microphone array configured to detect noise from the noise source before the noise reaches the at least one speaker array, each microphone array generating an output signal indicative of the noise detected from the noise source; and a noise signal processor configured to receive the output signals from the at least one microphone array, the processor processing the output signals to determine a location of the noise source, to determine inverse sound waves based on the output signals, and to generate noise cancellation signals to drive at least one directional speaker within the at least one speaker array so that the at least one directional speaker generates the inverse sound waves directed towards a noise source to reduce the effect of the detected noise from the noise source before the noise reaches the location of the at least one speaker array;

wherein the areas of sound interference are caused by buildings and geographical features within the noise cancellation area.

38. A method for reducing the effect of noise generated by a noise source, the method comprising:

providing at least one speaker array, each speaker array including a plurality of directional speakers arranged to provide substantially 360° coverage for sound waves produced by the speaker array;

detecting noise from the noise source before the noise reaches the at least one speaker array;

determining a location of the noise source;

generating noise cancellation signals based on the detected noise and the determined location of the noise source; and driving at least one directional speaker of the at least one speaker array with the noise cancellation signals so that the at least one directional speaker generates the inverse sound waves directed toward the noise source to reduce the effect of the detected noise from the noise source before the noise reaches the location of the at least one speaker array;

further comprising generating calibration sound waves with the at least one speaker array; detecting the calibration sound waves; determining areas of sound interference within a noise cancellation area; and adjusting the noise cancellation signals based on the determined areas of sound interference within the noise cancellation area.

39. The method of claim 38, wherein the noise source is a moving noise source, the method further comprising determining a predicted path of the moving noise source based on the detected noise and the determined location of the noise source.

40. The method of claim 39, further comprising adjusting the noise cancellation signal based on the predicted path of the moving noise source.

41. The method of claim 39, further comprising adjusting a phase and a frequency of the inverse sound waves based on the location of the at least one speaker array relative to the location and the predicted path of the noise source.

42. The method of claim 38, further comprising generating and storing sound profiles from at least one known noise source; and adjusting the noise cancellation signals to generate the inverse sound waves based on the stored sound profiles from the at least one known noise source.

43. The method of claim 38, further comprising adjusting at least one of a height and an angular orientation of the plurality of directional speakers of the at least one speaker array based on the inverse sound wave necessary to reduce the effect of the detected noise.

* * * * *